United States Patent
Roy

(10) Patent No.: US 8,709,645 B2
(45) Date of Patent: Apr. 29, 2014

(54) BATTERY POUCH SHEET EDGE INSULATION

(75) Inventor: Loren L. Roy, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 13/175,292

(22) Filed: Jul. 1, 2011

(65) Prior Publication Data

US 2013/0004835 A1  Jan. 3, 2013

(51) Int. Cl.
*H01M 2/00* (2006.01)
*H01M 2/04* (2006.01)
*H01M 2/08* (2006.01)
*B29D 22/00* (2006.01)
*B32B 3/00* (2006.01)
*B32B 15/08* (2006.01)
*B32B 27/08* (2006.01)
*B32B 27/34* (2006.01)
*B32B 9/00* (2006.01)
*B32B 19/00* (2006.01)

(52) U.S. Cl.
USPC .......... 429/185; 429/163; 429/176; 428/35.9; 428/458; 428/474.4; 428/689; 428/189

(58) Field of Classification Search
USPC .............. 429/163, 176, 185; 428/35.9, 458, 428/474.4, 689, 189
See application file for complete search history.

(56) References Cited

U.S. PATENT DOCUMENTS

| | | | |
|---|---|---|---|
| 6,048,638 A | 4/2000 | Pendalwar | |
| 6,296,967 B1 | 10/2001 | Jacobs et al. | |
| 7,776,466 B2 | 8/2010 | Oh | |
| 7,846,580 B2 | 12/2010 | Oh | |
| 2001/0055676 A1* | 12/2001 | Smith | 428/336 |
| 2004/0038125 A1* | 2/2004 | Kim et al. | 429/162 |
| 2004/0043290 A1* | 3/2004 | Hatta et al. | 429/185 |
| 2006/0035141 A1 | 2/2006 | Lee | |
| 2006/0073383 A1 | 4/2006 | Han et al. | |
| 2006/0099503 A1 | 5/2006 | Lee | |
| 2006/0188777 A1* | 8/2006 | Kaneta | 429/128 |
| 2006/0216585 A1 | 9/2006 | Lee | |
| 2007/0072071 A1 | 3/2007 | Lee | |
| 2007/0154803 A1 | 7/2007 | Kim et al. | |
| 2007/0202398 A1 | 8/2007 | Kim | |
| 2008/0070067 A1 | 3/2008 | Jang et al. | |
| 2008/0107963 A1 | 5/2008 | Lee et al. | |
| 2008/0180308 A1* | 7/2008 | Okada et al. | 342/1 |
| 2008/0193838 A1 | 8/2008 | Oh | |

* cited by examiner

*Primary Examiner* — Eugenia Wang
(74) *Attorney, Agent, or Firm* — Blakely, Sokoloff, Taylor, Zafman LLP

(57) ABSTRACT

A multi layer laminate sheet suitable to form a battery pouch is described. The laminate sheet includes a core metal layer, a sealant layer, and an insulating layer. The sealant layer is bonded to one surface of the core metal layer, and the insulating layer is bonded to the other surface of the core metal layer. The insulating layer has a width that is greater than the width of the core metal layer, such that the insulating layer extends past two edges of the core metal layer. When the pouch is formed by folding the laminate sheet, the insulating layer protects the edges of the core metal layer of the laminate sheet from being exposed around the edges or sides of the pouch. Other embodiments are also described and claimed.

20 Claims, 5 Drawing Sheets

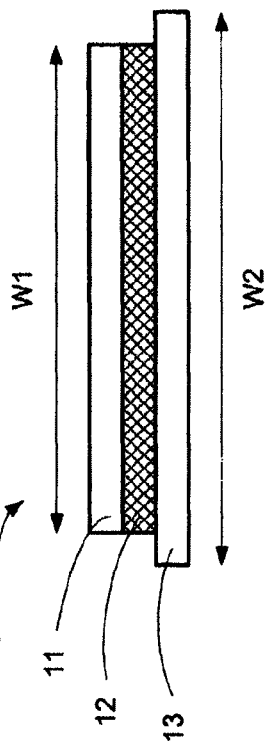
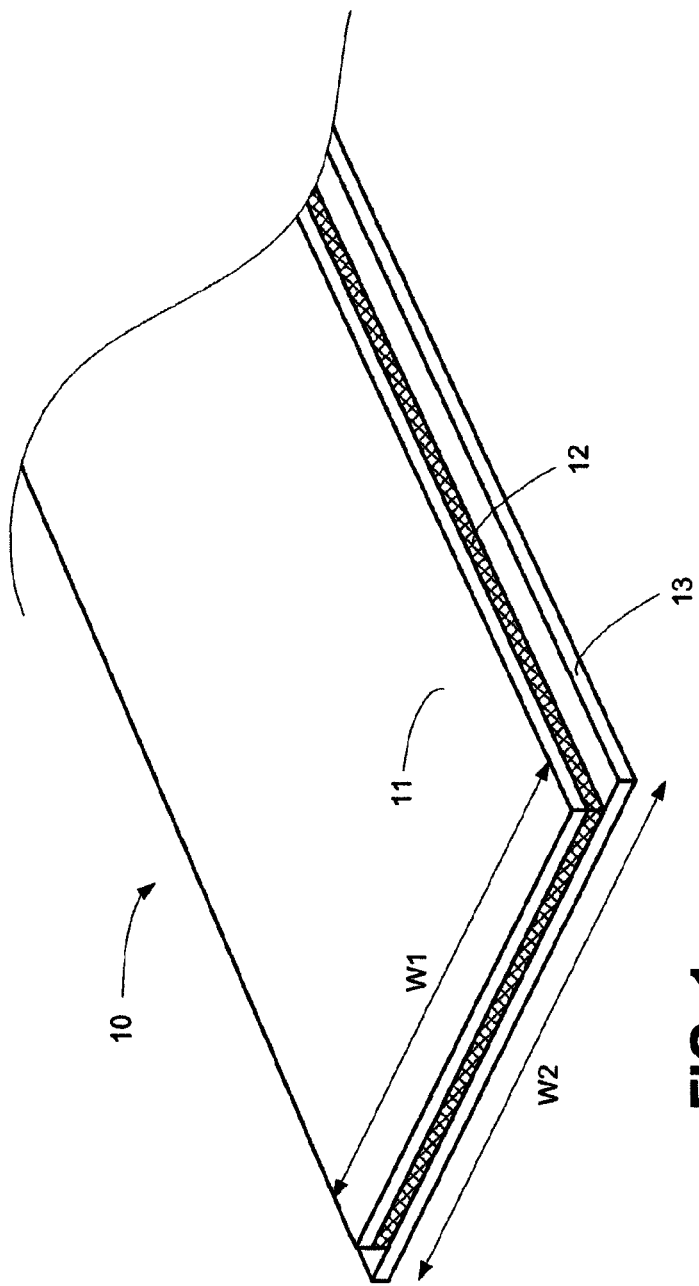

BATTERY POUCH SHEET EDGE INSULATION

An embodiment of the invention relates to a pouch type lithium polymer battery. Other embodiments are also described.

BACKGROUND

Recently, compact and light portable electronic devices, such as smart phones, notebook and tablet computers, and media players, have been actively developed and produced. Batteries are commonly used as an internal power source for such portable devices to enable the device to operate when external power sources are not available. Batteries may employ any of a number of electrochemical technologies and may be manufactured in a variety of form factors. For portable devices, interest in pouch type lithium ion polymer batteries (also referred to as lithium polymer batteries has increased because of low manufacturing costs, light weight, and easy modification in shape.

A pouch type lithium polymer battery is constructed by mounting an electrode assembly in a pouch type case that is made of a multi-layer laminate sheet. In conventional pouch type batteries, the multi-layer laminate sheet has a core layer that is a metallic foil. The metallic foil is substantially moisture and oxygen impervious, to prevent undesirable reactions from moisture or oxygen interacting with an electrolyte inside the case. When the case is sealed, the metal foil is exposed around the edges of the case and thus needs to be insulated to prevent corrosion of the pouch material, which may occur if the metallic foil is grounded or electrically biased as a result of unintended contact with other metal parts in the portable device. Typically, to insulate the metallic foil, the sealed edges of the case are manually folded against the sides of the case, and tape is then placed over the sealed edges to insulate the metallic foil and secure the edges against the sides of the case. This manual process of insulating the metallic foil can be time consuming and thus expensive. Furthermore, folding the sealed edges in this manner and applying tape over them increases the overall size of the battery. This may limit the size of the electrode assembly that can be placed inside the case; alternatively, it may reduce valuable space within the portable electronic device in which the battery is installed.

SUMMARY

A battery pouch sheet that inherently insulates an edge of a core metal layer of the sheet is described. The multi-layer laminate sheet includes a core layer, a sealant layer, and an insulating layer. The core layer has two surfaces. One surface of the core layer is attached to the sealant layer, and the other surface is attached to the insulating layer. The insulating layer is wider than the core layer.

In one embodiment, when the sheet is folded and heat sealed to form a pouch that encloses a battery electrode assembly, the sealant layer forms the interior lining of the pouch, and the insulating layer forms the exterior lining of the pouch. Because the insulating layer is wider than the core layer, e.g., similar to an overhang, the peripheral sections of the insulating layer protect the edges of the core layer from being exposed around the edges or a side of the pouch. This inherently insulates the core layer, without the need to fold and tape the peripheral sections of the insulating layer to the side of the pouch.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1 is a perspective view of a multi-layer laminate sheet.

FIG. 2 is an elevation view of the multi-layer laminate sheet.

DETAILED DESCRIPTION

Figure 3:
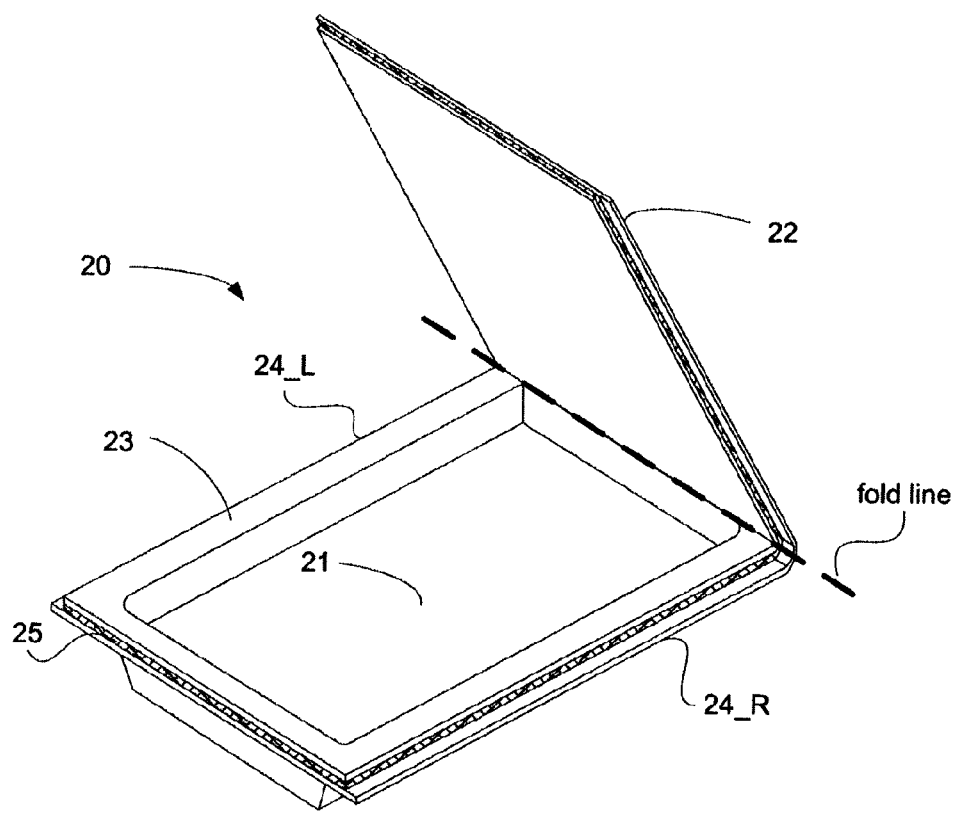
FIG. 3 is a perspective view of an open pouch.

Several embodiments of the invention with reference to the appended drawings are now explained. Whenever the shapes, relative positions, and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 and FIG. 2 show a multi-layer laminate sheet 10 that may be used to form a pouch type case for a battery such as a lithium ion polymer battery (also referred to as a lithium polymer battery). The multi-layer material 10 may have an inner sealant layer 11, a core layer 12, and an outer insulating layer 13. The core layer 12 has a width W1. The inner sealant layer 11 may have the same width W1 as the core layer 12. The width W1 is chosen according to the particular design of the battery. The outer insulating layer 13 has a width W2 that is greater than the width W1 of the core layer 12, such that the opposing left and right edges of the outer layer 13 as shown extend far enough past the opposing left and right edges of the core layer 12, respectively, to provide adequate insulation for the edges of the core layer 12. For example, the edges of the outer layer 13 may extend approximately 0.1 to 0.5 millimeters past the respective edges of the core layer 12, making the width W2 of the outer layer 13 approximately 0.2 to 1 millimeter greater than the width W1 of the core layer 12.

The inner sealant layer 11 may be a polyolefin-based polymer. The inner sealant layer 11 directly contacts an electrode assembly. It serves to electrically shield the electrode assembly by virtue of the heat fusion and insulation properties of the polymer. Examples of the polyolefin-based polymer include, but are not limited to, polypropylene, chlorinated polypropylene, polyethylene, ethylene-propylene copolymer, polyethylene-acrylic acid copolymer, and polypropylene-acrylic acid copolymer. In particular, casting polypropylene film (CPP) may be used as the inner sealant layer 11. The inner sealant layer 11 may have a thickness in the range of 30 to 150 microns.

The core layer 12 is interposed between the inner sealant layer 11 and the outer insulating layer 13. It may be made of a metal foil and serves as a substrate, which prevents moisture and air from penetrating the pouch and maintains the strength of the laminate sheet 10. Examples of material that may be used to form the metal foil include aluminum, nickel, and steel. The core layer 12 may have a thickness in the range of 20 to 150 microns.

The outer insulating layer 13 provides insulation to protect the other layers, particularly the core layer 12, of the laminate sheet. Examples of a polymer that may be used as the outer layer 13 include nylon, particularly, oriented nylon film. The outer layer 13 may have a thickness in the range of 15 to 25 microns.

To form the multi-layer sheet 10, the core layer 12 is prepared to have a width that is appropriate for a cell design of an electrode assembly that is to be enclosed by the pouch. The inner layer 11 may be prepared to have the same width as the core layer 12. The outer layer 13 is prepared to have a width that is wider than the width of the core layer 12. The inner layer 11 is positioned against one surface of the core layer 12. The outer layer 13 is positioned against the other surface of the core layer 12, such that the edges of the outer layer 13 extend past the edges of the core layer 12. The layers may then be bonded together using, for example, dry lamination, heat lamination, or extrusion lamination. For instance, an adhesive may be interposed between one layer and another layer and then allowed to dry. The adhesive may be an adhesive such as urethane resin, which has an adhesion and tensile strength that prevents interlayer separation over time and prevents the pouch from being damaged by external impacts. The layers are then bonded to each other using a heating roll under a predetermined pressure at a temperature higher than room temperature. Alternatively, the layers may be bonded to each other using a pressure roll under a predetermined pressure at room temperature.

Figure 4:
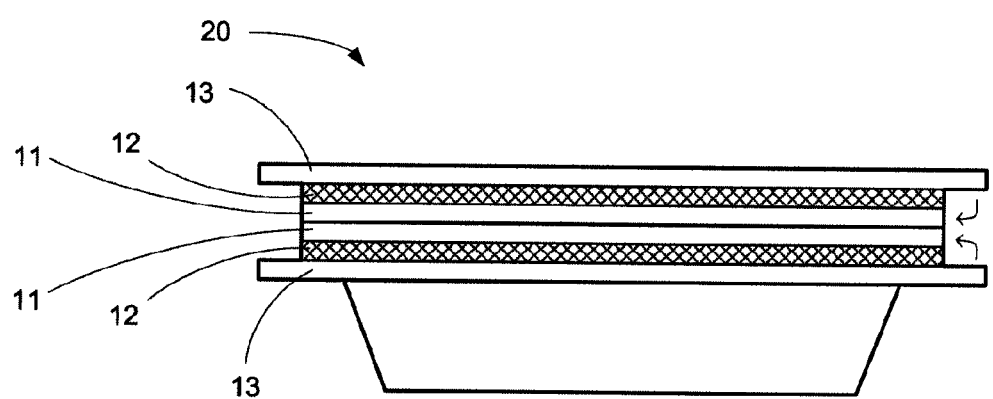
FIG. 4 is an elevation view of a closed, but not yet sealed pouch.
Figure 5:
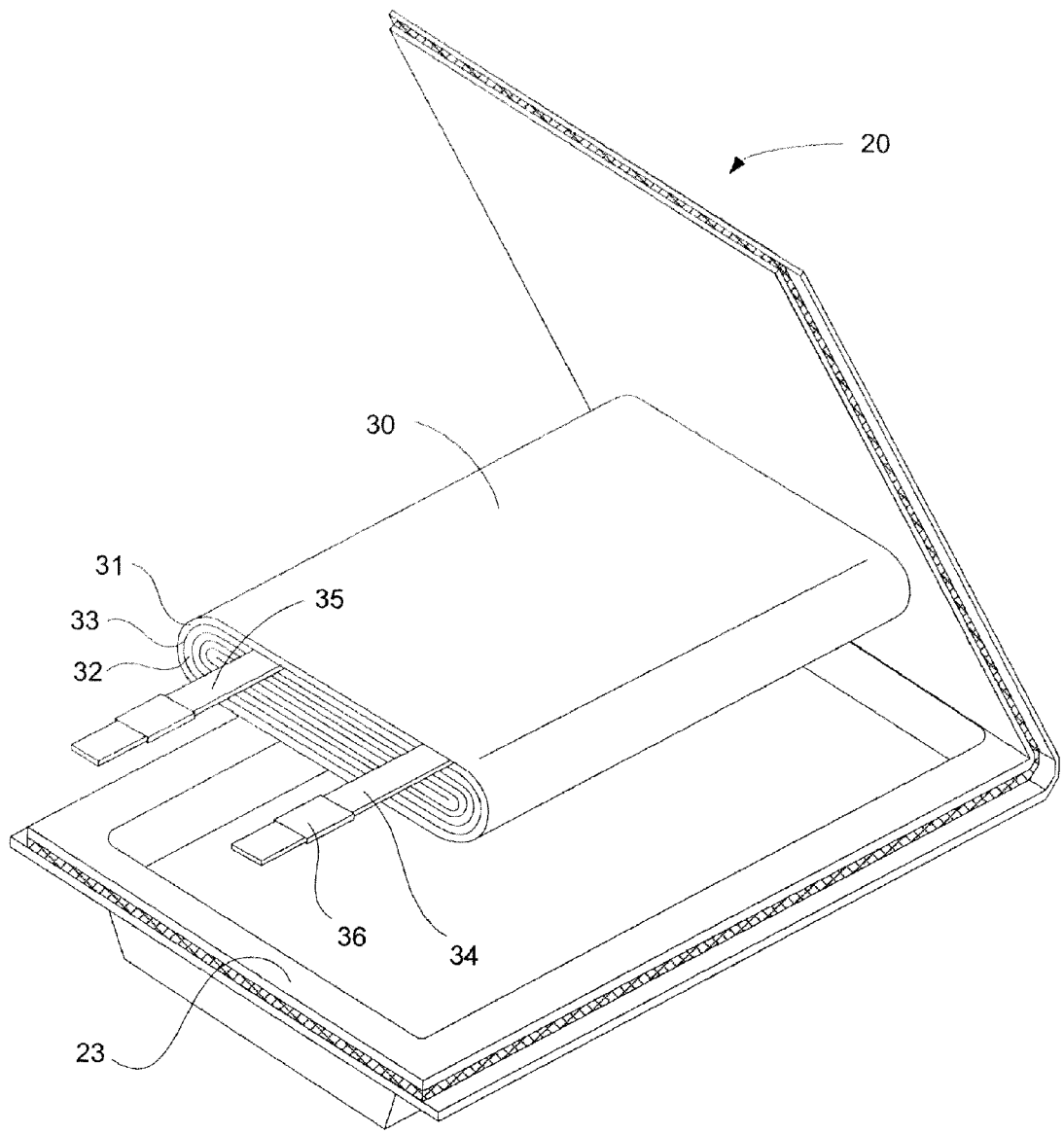
FIG. 5 is a perspective view depicting the placement of an electrode assembly within the pouch.

FIG. 3 and FIG. 4 show a pouch type case 20 that may be constructed from the multi-layer laminate sheet 10. To create the pouch 20, a cavity 21 may be formed in the laminate sheet 10, and the laminate sheet 10 is folded to create a top section 22 that covers the cavity 21. In one embodiment, first and second sections of the sheet are folded about a fold line that is substantially perpendicular to the opposing edges of the sheet 10, as shown in FIG. 3. The cavity 21 and the top section 22 are created such that the inner sealant layer 11 forms the interior surface of the pouch 20 and the outer insulating layer 13 forms the exterior surface of the pouch 20. The cavity 21 has a predetermined width and depth for receiving an electrode assembly 30, as shown in FIG. 5.

After placing the electrode assembly 30 in the cavity 21, the top section 22 and the margin 23 of the sheet 10 surrounding the cavity 21 may be bonded together to seal the pouch, as shown in FIG. 4. The pouch 20 may be heat sealed along three sides of the pouch 20 as shown. A fourth side of the pouch 20 is typically formed by the folding of the pouch 20 to create the top section 22 and thus does not require heat sealing. To enclose the electrode assembly 30 and seal the pouch 20, the peripheral portion of the inner sealant layer 11 at the top section 22 and the portion of the inner sealant layer 11 at a flange or margin 23 may be bonded to each other to result in a completely sealed pouch 20.

In another embodiment, the pouch may be created from two separate multi-layer laminate sheets 10. A cavity may be formed in one of the two sheets. The other sheet may be used as the top section of the pouch that covers the cavity. After placing the electrode assembly in the cavity, the top section and the margin of the sheet surrounding the cavity may be bonded together to seal the pouch. In this case, the pouch may be heat sealed along four sides of the pouch. To enclose the electrode assembly and seal the pouch, the peripheral portion of the inner sealant layer of the top section and the inner sealant layer of the margin may be bonded to each other to result in a completely sealed pouch.

In yet another embodiment, cavities may be formed in both the top section and the bottom section of the pouch. In one embodiment, the multi-layer laminate sheet may be folded about a fold line that is substantially perpendicular to the opposing edges of the sheet to create the top section and the bottom section. In another embodiment, two separate sheets may be used for the top section and the bottom section. The cavity of each section may, for example, have a depth that is one-half the height of the electrode assembly. After placing the electrode assembly in the cavity of the bottom section, the cavity of the top section may be positioned over the electrode assembly. The margin of the top section surrounding the top cavity and the margin of the bottom section surrounding the bottom cavity may be bonded together to seal the pouch. To enclose the electrode assembly and seal the pouch, the portion of the inner sealant layer at the margin of the top section and the portion of the inner sealant at the margin of the bottom section may be bonded to each other to result in a completely sealed pouch.

Note that while the figures here show the sheet 10 having the "overhanging" peripheral sections of the insulating layer 13 at the two opposing sides 24_L, 24_R of the pouch 20 (see for example FIG. 3), the sheet 10 could also be prepared so as to have a further overhanging section at its end 25. The latter is the cut end of the pouch 20, opposing the end through which the fold line runs (see FIG. 3).

FIG. 3 shows the pouch 20 as having substantially straight sides 24_L, 24_R, and a substantially straight end 25. However, when the cavity 21 is formed in the multi-layer laminate sheet 10 with each layer having substantially straight edges, the sides 24_L, 24_R, and the end 25 of the pouch 20 may not be straight. Rather, the margin 23 may have a variable width around the cavity 21, where the width is dependent upon the shape and size of the cavity. The variable width of the margin 23 may cause the sides 24_L, 24_R, and end 25 to have a wavy shape, and thus the edges of the bottom section of the pouch 20 may not align with the edges of the top section 56. The multi-layer laminate sheet may be designed and manufactured to have a shape that compensates for this effect. The sheet may have a shape such that when the cavity is formed in the sheet, the sides 24_L, 24_R, and end 25 will be substantially straight and align with the edges of the top section 56. The shape of the sheet may be dependent upon the shape and size of the cavity that is to be formed in the sheet.

Figure 6:
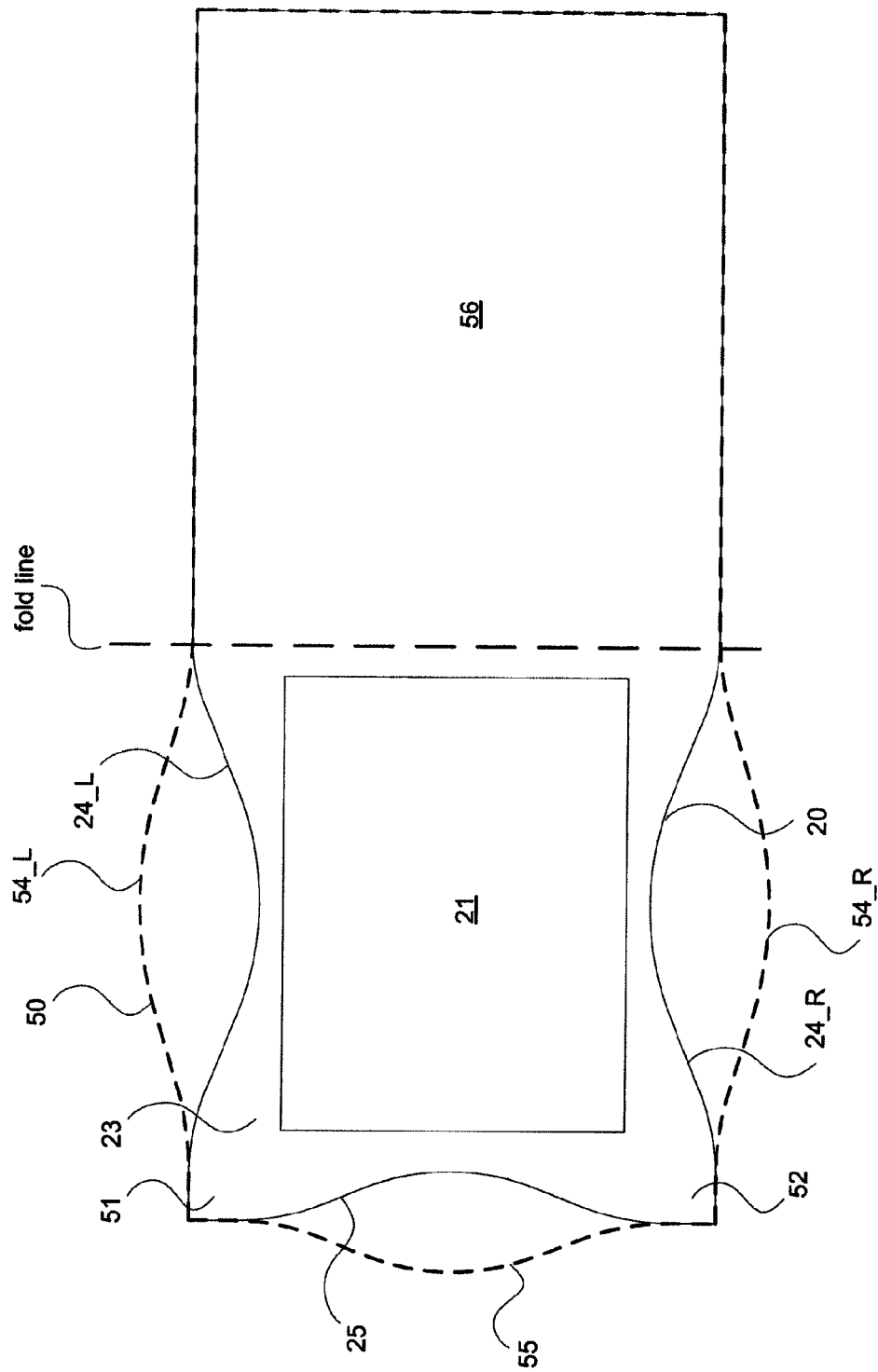
FIG. 6 is a top view of a pouch superimposed with an alternative multi-layer laminate sheet, according to another embodiment of the invention.

FIG. 6 shows an example of the pouch 20 having a variable width margin 23. In FIG. 6, the sides 24_L, 24_R, and the end 25 of the pouch 20 may be wavy with the margin 23 being narrower around the sides of the cavity 21, as compared to the margin 23 around the corners of the cavity 21. This is due to more sheet material being pulled into the center of the cavity 21 to form the cavity 21. To compensate for this effect, the sheet in which the cavity 21 is to be formed, referred to here as a sheet 50 (shown by the dotted line), may be manufactured such that the sheet 50 is narrower near the corners 51, 52 of the sheet 50, and wider towards the center of each side 54_R, 54b_L of the sheet 50 before forming the cavity 21. The sheet 50 may have a shorter length near the corners 51, 52 and a longer length at the center of the end 55. The sheet 50 has an overhanging outer insulating layer (not shown) and a core layer (not shown), with each layer having a shape similar to the sheet 50 that is shown in FIG. 6. The opposing left and right edges of the outer insulating layer extend far enough past the opposing right and left edges of the core layer, respectively, to provide adequate insulation for the edges of the core layer. When a cavity is formed in the sheet 50, more sheet material may be pulled into the center of the cavity 21 from the center of the sides 54_L, 54_R and end 55 of the sheet 50 to form the cavity 21. This may result in a pouch with a cavity section that has substantially straight sides and ends (unlike the pouch 20 shown in FIG. 6). After the cavity 21 is formed and the sheet 50 is folded along the fold line to form a top section 56, the sides 54_L, 54_R and end 55 of the cavity section will align with the straight edges of the top section 56. Thus, the edges of the overhanging outer insulating layer at the cavity section will align with the edges of the overhanging outer insulating layer at the top section 56, thereby preventing the core layer from being exposed around the edges of the pouch and providing electrical insulation for the core layer. The sheet 50 may be designed to have a shape other than that shown in FIG. 6, depending on the size and shape of the cavity 21.

As shown in FIG. 4, the sealed pouch 20 has portions of the outer insulating layer 13, at the top section 22 and at the cavity 21, extending past the edges of the core layer 12 (in the top section 22 and in the cavity 21). This prevents the core layer 12 from being exposed around the edges of the pouch 20 and thus provides electrical insulation for the core layer 12, without manual processing of the pouch 20 by, for example, folding and taping the sealed edges to the side of the pouch 20. Eliminating the tape may reduce the overall height of the battery pack by about 50 microns and the overall width by about 100 microns. This may contribute about 1% to 2% additional energy density (by virtue of fitting a larger battery cell and electrode assembly). The extended portions of the outer insulating layer 13 may be folded inward (in the direction of the arrows shown in FIG. 4) and heat sealed or otherwise bonded together (or to the side of the pouch 20), to provide further protection for the core layer 12.

Referring to FIG. 5, the pouch 20 may enclose an electrode assembly 30. The electrode assembly 30 includes a positive electrode plate 31 that has a coating made of positive active materials and a negative electrode plate 32 that has a coating made of negative active materials. An electrolyte separator 33 may be positioned between the positive electrode plate 31 and the negative electrode plate 32, to prevent a short circuit between the positive electrode plate 31 and the negative electrode plate 32 and allowing only appropriate chemical transport between the positive electrode plate 31 and the negative electrode plate 32. Electrode assemblies of other suitable battery chemistries are possible.

A positive electrode tab 34 is bonded to the positive electrode plate 31 and protrudes for a predetermined length to extend outside of the pouch. Similarly, a negative electrode tab 35 is bonded to the negative electrode plate 32 and protrudes for a predetermined length to extend outside of the pouch. The positive electrode tab 34 and the negative electrode tab 35 may be made of materials such as aluminum, copper, or nickel. The tabs 34 and 35 should have sufficient thickness and size to carry a substantial amount of current without any appreciable voltage drop.

Insulating sleeves 36 may be installed on the positive electrode tab 34 and the negative electrode tab 35 to prevent a short circuit between the electrode tabs 34 and 35 and the core layer 12 of the pouch 20 (at the outside edge of the margin 23). The insulating sleeves 36 should form a hermetic seal, to prevent air and moisture from entering the pouch 20 and electrolyte from leaking out of the pouch 20.

Figure 7:
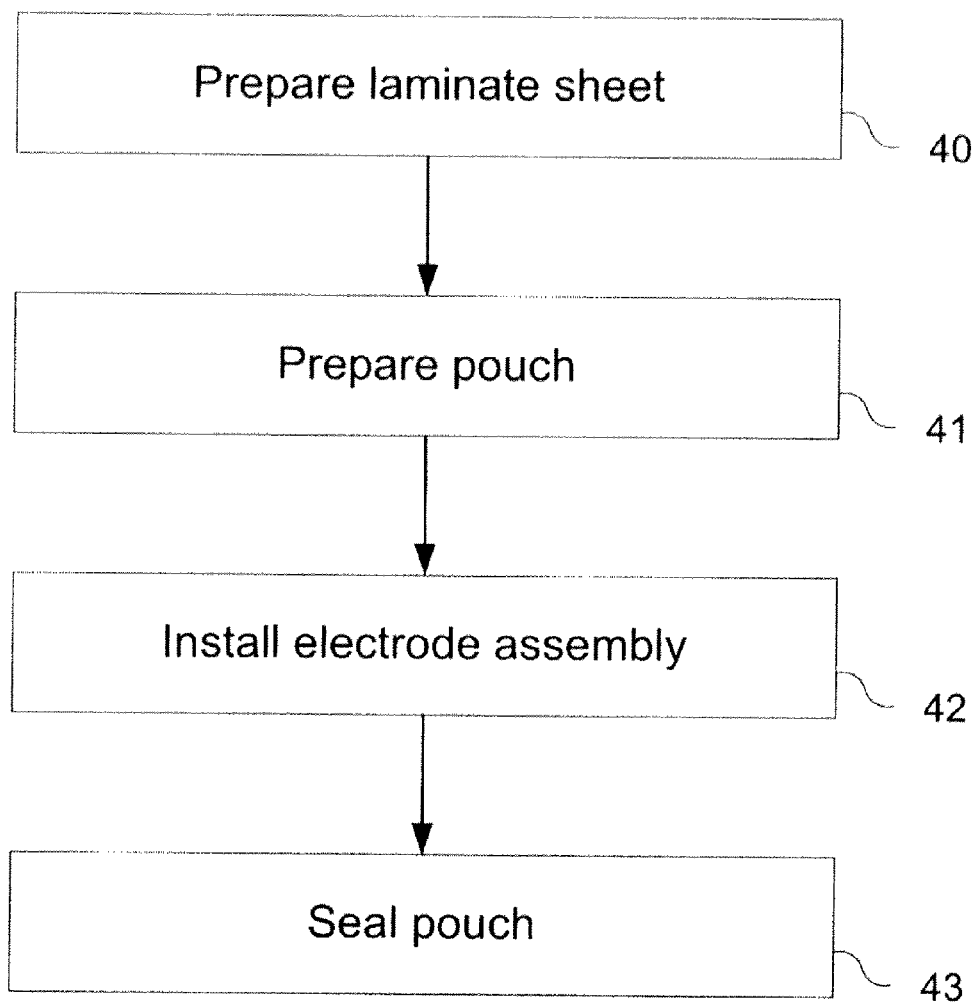
FIG. 7 is a flow chart of the operations performed to manufacture a battery pack.

FIG. 7 is a flow chart of the operations performed to manufacture a battery pack using the multi-layer sheet 10. Manufacturing the battery pack includes preparing the multi-layer laminate sheet 10 (block 40), preparing the pouch 20 (block 41), installing the electrode assembly 30 (block 42), and sealing the pouch 20 (block 43). These operations have been described in detail above.

For purposes of explanation, specific embodiments were described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the apparatus and methods of the present invention disclosed herein without departing from the spirit and scope of the invention as defined in the appended claims. For instance, while FIG. 5 shows a pouch 20 as containing an electrode assembly 30, the pouch 20 may alternatively be used to house multiple cells each of which may have been separately sealed. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A multi-layer sheet suitable to form a battery pouch, comprising:
    a core metal layer having a first surface and a second surface that is opposite the first surface;
    a sealant layer attached to the first surface of the core metal layer, wherein the multi-layer sheet has a fold therein and the sealant layer is continuous across the fold; and
    an insulating layer attached to the second surface of the core metal layer and having a width that is greater than a width of the core metal layer such that the insulating layer extends past a left edge and a right edge of the core metal layer.

2. The multi-layer sheet of claim 1, wherein the core metal layer is aluminum.

3. The multi-layer sheet of claim 1, wherein the sealant layer is cast polypropylene.

4. The multi-layer sheet of claim 1, wherein the insulating layer is nylon.

5. The multi-layer sheet of claim 1, wherein a first section and a second section of the sheet are folded against each other to enclose a cavity in which an electrode assembly can be housed.

6. The multi-layer sheet of claim 5, wherein the first section and the second section are folded such that the sealant layer defines an interior of the cavity to form a pouch, and the insulating layer covers an exterior of the pouch.

7. The multi-layer sheet of claim 5, wherein the sealant layer in the first section is thermally bonded to the sealant layer in the second section to enclose the cavity in which the electrode assembly is contained.

8. The multi-layer sheet of claim 7, wherein the insulating layer in the first section and the insulating layer in the second section provide electrical insulation for the core metal layer by shielding the left and right edges of the core metal layer.

9. The multi-layer sheet of claim 1, wherein the sealant layer has a thickness in the range of 30 to 150 microns.

10. A battery, comprising:
    an electrode assembly; and
    a pouch formed by first and second laminated sheet sections each of which includes a sealant layer that forms an interior lining of the pouch and an inner metal layer interposed between the sealant layer and an outer insulating layer, wherein the sealant layer in the first laminated sheet section is heat sealed in direct contact with the sealant layer in the second laminated sheet section to seal the pouch, wherein the outer insulating layer of each of the first and second laminated sheet sections forms an exterior lining of the pouch and extends beyond a left edge and a right edge of the inner metal layer to protect the left and right edges of the inner metal layer.

11. The battery of claim 10, wherein the electrode assembly includes a positive electrode plate and a positive electrode tab attached to the positive electrode plate, a negative electrode plate and a negative electrode tab attached to the negative electrode plate, and a separator positioned between the positive electrode plate and the negative electrode plate.

12. The battery of claim 10, wherein the outer insulating layer of the laminate sheet sections is nylon.

13. The battery of claim 10, wherein a peripheral portion of the outer insulating layer, which extends beyond of the inner metal layer, is folded over the left edge of the inner metal layer.

14. The battery of claim 10, wherein the outer insulating layer extends past each of the left and right edges of the inner metal layer by approximately 0.1 to 0.5 millimeter.

15. The battery of claim 10, wherein the sealant layer directly contacts the electrode assembly.

16. A battery pouch comprising:
    a multi-layer sheet having a metal layer interposed between a sealant layer and an insulating layer, the sealant layer being bonded to seal the pouch, wherein the insulating layer has a width that is greater than a width of the metal layer so that a peripheral portion of the insulating layer extends beyond an edge of the metal layer and has been folded inward to protect the edge of the metal layer from being exposed outside of the pouch when the pouch has been sealed, wherein the multi-layer sheet has a fold therein and the sealant layer is continuous across the fold.

17. The battery pouch of claim 16 wherein the insulating layer extends beyond the edge of the metal layer by between 0.1 to 0.5 mm.

18. The battery pouch of claim 16 wherein a cavity is formed in the multi-layer sheet in which a battery electrode assembly can fit, and a top section of the multi-layer sheet has been folded over a bottom section of the multi-layer sheet to cover the cavity.

19. The battery pouch of claim 17 wherein a cavity is formed in the multi-layer sheet in which a battery electrode assembly can fit, and a top section of the multi-layer sheet has been folded over a bottom section of the multi-layer sheet to cover the cavity.

20. The battery pouch of claim 18 wherein the cavity is sealed by bonding the sealant layer in the top section to the sealant layer in the bottom section.

\* \* \* \* \*